(12) United States Patent
Yoh et al.

(10) Patent No.: US 6,722,257 B2
(45) Date of Patent: Apr. 20, 2004

(54) WORKPIECE HIGH-SPEED PRESSURIZING METHOD AND MECHANISM BY USING CYLINDER WITH CUSHIONING MECHANISM

(75) Inventors: Seikai Yoh, Tsukuba-gun (JP); Kouichiro Ishibashi, Tsukuba-gun (JP); Hitoshi Yamamoto, Tsukuba-gun (JP); Nobuhiro Fujiwara, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 5 days.

(21) Appl. No.: 10/035,121

(22) Filed: Jan. 4, 2002

(65) Prior Publication Data

US 2002/0117051 A1 Aug. 29, 2002

(30) Foreign Application Priority Data

Feb. 23, 2001 (JP) .......................................... 2001-049020

(51) Int. Cl.⁷ ................................................. F15B 15/22
(52) U.S. Cl. .............................. 91/408; 91/392; 91/420; 91/451
(58) Field of Search .......................... 91/394, 408, 409, 91/420, 451; 92/13.1, 13.4, 13.6

(56) References Cited

U.S. PATENT DOCUMENTS

| | | | | |
|---|---|---|---|---|
| 3,626,807 A | * | 12/1971 | Shartzer | 91/394 |
| 3,933,080 A | * | 1/1976 | Corrie | 91/394 |
| 4,538,506 A | * | 9/1985 | Mattsson | 92/13.6 |

* cited by examiner

Primary Examiner—F. Daniel Lopez
(74) Attorney, Agent, or Firm—Oblon, Spivak, McClelland, Maier & Neustadt, P.C.

(57) ABSTRACT

At a step of pressurizing a workpiece after reducing a speed of a piston rod at an end of a forward stroke of the piston rod by restrictively allowing compressed air to flow out of an exhaust-side pressure chamber, operation of a rapid exhaust valve is triggered by reduction of internal pressure of the exhaust-side pressure chamber to lower pressure than internal pressure of a pressurizing-side pressure chamber to thereby directly open the exhaust-side pressure chamber into the atmosphere through the rapid exhaust valve and rapidly reduce back pressure of a main piston remaining in the exhaust-side pressure chamber.

13 Claims, 6 Drawing Sheets

WORKPIECE HIGH-SPEED PRESSURIZING METHOD AND MECHANISM BY USING CYLINDER WITH CUSHIONING MECHANISM

TECHNICAL FIELD

The present invention relates to workpiece high-speed pressurizing method and mechanism by a cylinder with a cushioning mechanism, the method and mechanism being suitable for use as a gun cylinder or the like for spot welding and more concretely to high-speed pressurizing method and mechanism suitable for a case of pressurizing a workpiece at an end of a projecting stroke of a piston rod by using a cylinder with a cushioning mechanism for reducing a speed of the piston rod near the end of the projecting stroke by restricting a flow rate of exhaust from an exhaust-side pressure chamber.

PRIOR ART

It is required that a movable-side electrode driven by a gun cylinder for spot welding faces a workpiece on a fixed-side electrode through a relatively short working stroke to carry out a plurality of times of spot welding in a minimum amount of time while changing a welding position. There are also required specifications such as reduction of wear of a tip end of a welding rod (chip) and diminishing of a collision sound. These required specifications can be satisfied by using a cylinder having a cushioning mechanism for reducing a speed of a piston rod near an end of a projecting stroke by temporarily encapsulating air pressure in an exhaust-side pressure chamber but, as a result, the speed of the piston rod is reduced, even though it is temporary. Therefore, this speed reduction becomes a detriment to the requirement of shortening of welding time (speedup).

Moreover, it is required in the spot welding that pressurization with a maximum output is carried out finally even though the speed of the piston rod near the end of the projecting stroke is reduced for reducing wear of the welding rod and diminishing the collision sound and the speed reduction of the welding rod by the cushioning mechanism also delays timing of the pressurization. Furthermore, because a position of the workpiece with which the welding rod comes in contact for pressurization is not a predetermined position due to wear of the welding rod and variations in dimensions of the workpiece, it is not appropriate to control the operation by a projecting length of the piston rod.

The above-described problems are found not only in the spot welding gun cylinder but also in a device such as a pressurizing unit of various clamping devices in which a head mounted to a tip end of a piston rod is repeatedly pushed against a workpiece. In this case, there are similar problems.

DISCLOSURE OF THE INVENTION

It is an object of the present invention to solve the above problems basically by adding simple means to a prior-art fluid pressure cylinder for a spot welding gun or the like or a method for driving the cylinder.

It is more concrete object of the invention to provide workpiece high-speed pressurizing method and mechanism by a cylinder with a cushioning mechanism in which an amount of welding time can be minimized while reducing wear of a tip end of a welding rod or the like and diminishing a collision sound by using the cylinder with the cushioning mechanism for reducing a speed of a piston rod near an end of a forward stroke by restricting a flow rate of exhaust from an exhaust-side pressure chamber.

It is another object of the invention to provide workpiece high-speed pressurizing method and mechanism by a cylinder with a cushioning mechanism in which pressurization with a maximum output can be carried out rapidly after the speed of the piston rod is reduced near the end of the forward stroke and the welding rod or the like comes in contact with the workpiece.

It is another object of the invention to provide workpiece high-speed pressurizing method and mechanism by a cylinder with a cushioning mechanism in which pressurization with a maximum output can be carried out rapidly at an appropriate time irrespective of wear of the welding rod and variations of dimensions of the workpiece by estimating a position of the workpiece with which the welding rod or the like comes in contact from a relationship between pressures of the exhaust-side pressure chamber and a pressurizing-side pressure chamber when cushioning by the cylinder with the cushioning mechanism operates.

To achieve the above objects, a high-speed pressurizing method of the invention includes the steps of: moving a piston rod connected to a main piston forward by supplying air pressure into a head-side pressure chamber of the main piston; reducing a speed of the piston rod near an end of a forward stroke of the piston rod by restricting a flow rate of exhaust flowing out of a rod-side pressure chamber by using a throttle; and then pressurizing the workpiece with the piston rod, wherein internal pressure of the rod-side pressure chamber reduces to be lower than internal pressure of the head-side pressure chamber when the cushioning operates, the reduction triggers operation of a rapid exhaust valve, the rapid exhaust valve opens an exhaust flow path connecting the rod-side pressure chamber and atmosphere to directly exhaust compressed air from the rod-side pressure chamber into the atmosphere, and thus reduction of back pressure of the main piston in the rod-side pressure chamber is sped up to pressurize the workpiece at a high speed.

In the above method, if there is a possibility that the internal pressure of the rod-side pressure chamber reduces to be lower than the internal pressure of the head-side pressure chamber at the improper time, it is preferable that operation of the rapid exhaust valve is triggered by reduction of the internal pressure of the rod-side pressure chamber to the lower pressure than the internal pressure of the head-side pressure chamber and reduction of internal pressure of a flow path on a secondary side of the throttle to a certain low percentage of the internal pressure of the head-side pressure chamber.

A high-speed pressurizing mechanism of the invention comprises a cylinder including a main piston driven by air pressure, a piston rod connected to the main piston, a head-side pressure chamber and a rod-side pressure chamber formed on opposite sides of the main piston, and the cushioning mechanism for reducing a speed of the piston rod near an end of a projecting stroke by restricting a flow rate of exhaust flowing out of the rod-side pressure chamber by using a throttle and a rapid exhaust valve which is connected to the cylinder, operation of which is triggered by reduction of internal pressure of the rod-side pressure chamber to lower pressure than internal pressure of the head-side pressure chamber when cushioning operates, and which opens an exhaust flow path connecting the rod-side pressure chamber and atmosphere to thereby directly exhaust compressed air from the rod-side pressure chamber into the atmosphere.

In the above mechanism, if there is a possibility that the internal pressure of the rod-side pressure chamber reduces to be lower than the internal pressure of the head-side pressure chamber at the improper time, it is preferable that a differential pressure-driven valve for detecting reduction of internal pressure of a flow path on a secondary side of the throttle to a certain low percentage of the internal pressure of the head-side pressure chamber is added to the rapid exhaust valve and that operation of the rapid exhaust valve is triggered by reduction of the internal pressure of the rod-side pressure chamber to the lower pressure than the internal pressure of the head-side pressure chamber and reduction of the internal pressure of the flow path on the secondary side of the throttle to the certain low percentage of the internal pressure of the head-side pressure chamber.

In the invention, the rapid exhaust valve includes a diaphragm, two pressure receiving chambers formed on opposite sides of the diaphragm and connected to the head-side pressure chamber and the rod-side pressure chamber, and an open/close valve provided in the exhaust flow path to open and close the exhaust flow path in synchronization with displacement of the diaphragm.

The differential pressure-driven valve has a valve element for connecting the pressure receiving chamber on one side of the diaphragm to the head-side pressure chamber and atmosphere, two pressure receiving faces formed at opposite ends of the valve element and having different pressure receiving areas, and two pressure receiving chambers for applying the internal pressure of the head-side pressure chamber and the internal pressure of the flow path on the secondary side of the throttle to the pressure receiving faces.

According to a concrete embodiment of the invention, the cylinder has a cylinder tube in which the main piston is housed, a head cover mounted to an end of the cylinder tube, a rod cover which is mounted to the other end of the cylinder tube and which the piston rod passes through for sliding, and intermediate stop position setting means for setting an intermediate stop position of the main piston. The intermediate stop position setting means has a stop position setting piston housed for sliding between the main piston and the head cover, a setting rod connected to the setting piston and passing for sliding through the head cover, a stopper provided to the setting rod to define a stop position of the setting piston, and a contact portion which is formed at the head cover and with which the stopper comes in contact. Furthermore a flow path for supplying and discharging compressed air to and from the head-side pressure chamber is provided in the setting rod.

In the invention having the above structure, when the main piston and the piston rod are driven by air pressure, by restricting the flow rate of exhaust from the rod-side pressure chamber near the end of the forward stroke of the piston rod, the internal pressure of the pressure chamber increases over the head-side pressure chamber and the speed of the piston rod is reduced. At this time, because the compressed air is gradually flowing out of the rod-side pressure chamber through the throttle, the internal pressure which has temporarily increased over that of the head-side pressure chamber gradually reduces as the speed of the piston rod reduces and the internal pressure reduces to be lower than the internal pressure of the pressurizing-side pressure chamber around the time when the piston rod stops at the latest.

Because the piston rod is substantially at the end of the stroke and ready to pressurize the workpiece when the piston rod stops, it is effective to rapidly enhance the pressurizing force by the piston rod. Therefore, the internal pressures of the rod-side pressure chamber and the head-side pressure chamber are constantly compared with each other and operation of the rapid exhaust valve is triggered by reduction of the internal pressure of the rod-side pressure chamber to lower pressure than the internal pressure of the head-side pressure chamber to thereby directly release the back pressure of the main piston of the rod-side pressure chamber into the atmosphere without restricting the flow rate. As a result, the internal pressure of the rod-side pressure chamber reduces extremely rapidly. Therefore, it is possible to extremely rapidly enhance the pressurizing force applied to the workpiece as compared with a case in which the compressed air in the rod-side pressure chamber continues to be discharged through the throttle.

However, in an early stage of the forward stroke of the main piston and in a stage in which the compressed air is supplied to the head-side pressure chamber and the compressed air is discharged from the rod-side pressure chamber, there is a possibility that the internal pressure of the rod-side pressure chamber reduces to be lower than the internal pressure of the head-side pressure chamber. Therefore, there is a possibility that the rapid exhaust valve operates at the improper time if the operation of the rapid exhaust valve is simply triggered by reduction of the internal pressure of the rod-side pressure chamber to lower pressure than the internal pressure of the head-side pressure chamber.

In such a case, if the operation of the rapid exhaust valve is triggered by reduction of the internal pressure of the rod-side pressure chamber to the lower pressure than the internal pressure of the head-side pressure chamber and reduction of the internal pressure of the flow path on the secondary side of the throttle to the certain low percentage, e.g., 35% or lower of the internal pressure of the head-side pressure chamber when cushioning operates by restricting the flow rate of exhaust from the rod-side pressure chamber as described above, it is possible to avoid the above-described operation of the rapid exhaust valve at the improper time.

The rapid exhaust valve is not limited to the above-described structure in which the open/close valve is caused to operate by the diaphragm and various pressure responsive valves for comparing two pressures and operating based on a relationship between degrees of the pressures. If there is a possibility that the pressure responsive valve (rapid exhaust valve) operates at the above-described improper time, it is possible to take measures such as comparing the pressure in the flow path on the secondary side of the throttle and the internal pressure of the head-side pressure chamber and introducing the pressure fluid into the rapid exhaust valve through the valve element which operates when a certain pressure ratio between the pressures is obtained.

Furthermore, in the cylinder, it is possible to stop the main piston in the intermediate position by the intermediate stop position setting means. By the setting of the intermediate stop position, the main piston can occupy an operation preparing position where the piston rod faces the workpiece with a relatively short working stroke. Therefore, it is possible to minimize a length of the working stroke in a plurality of times of spot welding or the like to improve efficiency of the operation. When the workpiece is moved to a position facing the piston rod for replacement or the like, the main piston can be moved to a fully returned position at the maximum distance from the workpiece by canceling setting of the intermediate stop position.

DETAILED DESCRIPTION

Figure 1:
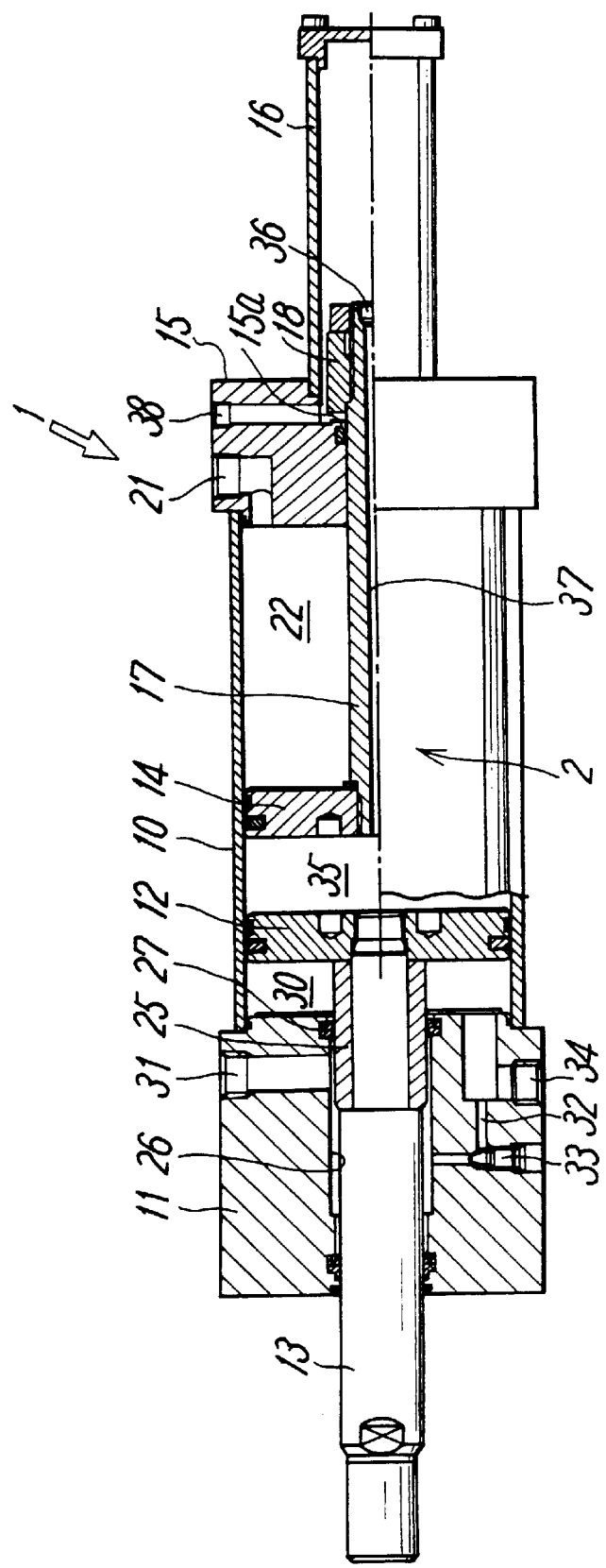
FIG. 1 is a sectional view of an essential portion of an example of a structure of a cylinder with a cushioning mechanism of the present invention.

FIG. 1 shows an example of a structure of a cylinder with a cushioning mechanism used in the present invention.

The cylinder 1 is suitable for use as a gun cylinder or the like for spot welding and includes a cylinder tube 10 having opposite ends to which a rod cover 11 and a head cover 15 are mounted, a main piston 12 for sliding in a sealed state in the cylinder tube 10, and a piston rod 13 having a base end portion connected to the main piston 12. The piston rod 13 passes through the rod cover 11 with a tip end portion of the piston rod 13 extending outside and is caused to move forward and rearward in an axial direction by the main piston 12.

To the cylinder 1, intermediate stop position setting means 2 for stopping the main piston 12 in an intermediate position is attached. The intermediate stop portion setting means 2 includes a stop position setting piston 14 disposed for sliding in a sealed state between the main piston 12 and the head cover 15 in the cylinder tube 10 and a setting rod 17 having a base end portion connected to the setting piston 14. A tip end portion of the setting rod 17 passes through the head cover 15 of the cylinder tube 10 and is lead out into a rod encapsulating tube 16; a stopper 18 is mounted to the tip end of the setting rod 17, and a stop position of the setting piston 14 and therefore an intermediate stop position of the main piston 12 can be set by bringing the stopper 18 into contact with a contact portion 15a on an outer face of the head cover 15.

Driving of the setting piston 14 is carried out by supplying compressed air from an auxiliary port 21 provided to the head cover 15 into an auxiliary pressure chamber 22 between the setting piston 14 and the head cover 15. At this time, the setting piston 14 moves to the intermediate stop position where the stopper 18 comes in contact with the contact portion 15a of the head cover 15 and comes in contact with the main piston 12 in the position to thereby define a rearward stroke of the main piston 12. Returning of the setting piston 14 is carried out by pressing the setting piston 14 against the returning main piston 12 in a state in which the compressed air in the auxiliary pressure chamber 22 is discharged from the auxiliary port 21.

Because a position of the setting rod 17 to which the stopper 18 is mounted is made variable, it is possible to make a stroke of the setting piston 14 variable.

The cylinder 1 includes a cushioning mechanism for reducing a speed of the main piston 12 at an end of a forward stroke by restricting a flow rate of exhaust from an exhaust-side pressure chamber. In order to form the cushioning mechanism, a cushion ring 25 is provided to the base end portion of the piston rod 13 in a position close to the main piston 12, a recessed portion 26 in which the cushion ring 25 is fitted is formed in the rod cover 11, and annular cushion packing 27 is provided to a mouth edge of the recessed portion 26. The cushion packing 27 comes in contact with an outer peripheral face of the cushion ring 25 to cut a direct connection between a rod-side pressure chamber 30 between the main piston 12 and the rod cover 11 and the recessed portion 26 when the cushion ring 25 enters the recessed portion 26. The rod cover 11 is formed with a main port 31 communicating with the recessed portion 26 and compressed air is supplied into the rod-side pressure chamber 30 from the main port 31 through the recessed portion 26 in returning of the main piston 12. Therefore, the cushion packing 27 is formed to carry out one-way sealing for allowing the compressed air from the main port 31 to flow into the pressure chamber 30 while intercepting a flow of compressed air from the pressure chamber 30 into the recessed portion 26.

The rod cover 11 is also formed with a flow path 32 for connecting the rod-side pressure chamber 30 to a portion in the recessed portion 26 on an inner side of the cushion packing 27 and is provided in the flow path 32 with a throttle valve 33 for restricting a flow rate of compressed air flowing from the pressure chamber 30 through the flow path 32 into the recessed portion 26. In a side face of the rod cover 11, a connecting port 34 for connecting a rapid exhaust valve 3 which will be described later is provided to communicate with the rod-side pressure chamber 30 through the flow path 32.

However, it is also possible to provide a single or a plurality of groove(s) in an inner peripheral face of the cushion ring 25 between the pressure chamber 30 and the recessed portion 26 in addition to or instead of the throttle valve 33 and to cause the groove(s) to function as a throttle. The connecting port 34 may communicate with the rod-side pressure chamber 30 through a dedicated flow path independent of the flow path 32 and having a large cross-sectional area.

On the other hand, a main port 38 for supplying compressed air into a head-side pressure chamber 35 formed on an opposite side of the main piston 12 is provided to the head cover 15 and communicates with an inside of the encapsulating tube 16. A supply/discharge opening 36 opening into the encapsulating tube 16 is provided to a tip end portion of the setting rod 17 connected to the setting piston 14 and communicates with the head-side pressure chamber 35 through a flow path 37 passing through the setting rod 17.

Figure 4:
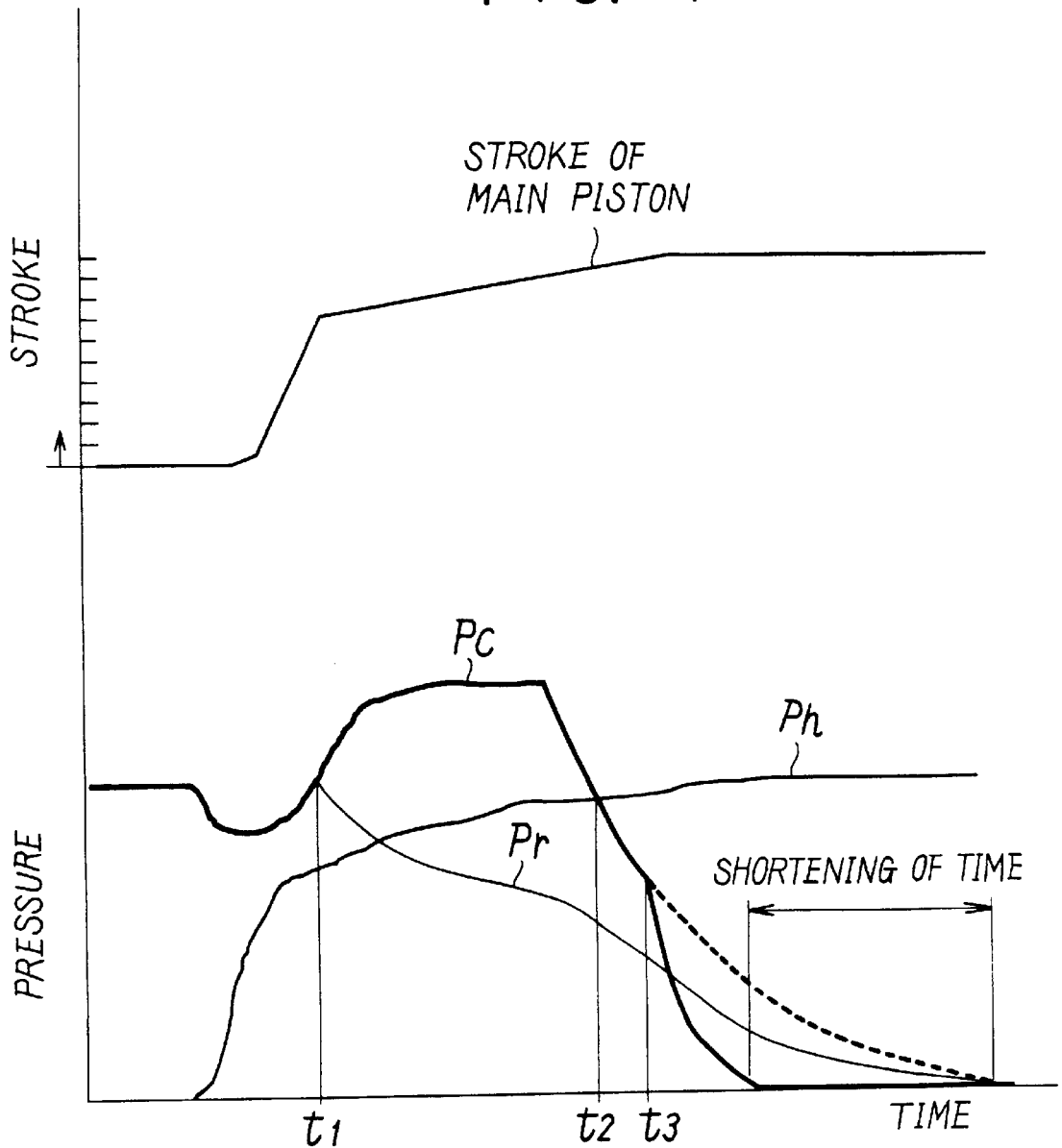
FIG. 4 is an explanatory view for explaining an example of a form of operation of the cylinder with the cushioning mechanism.
Figure 7:
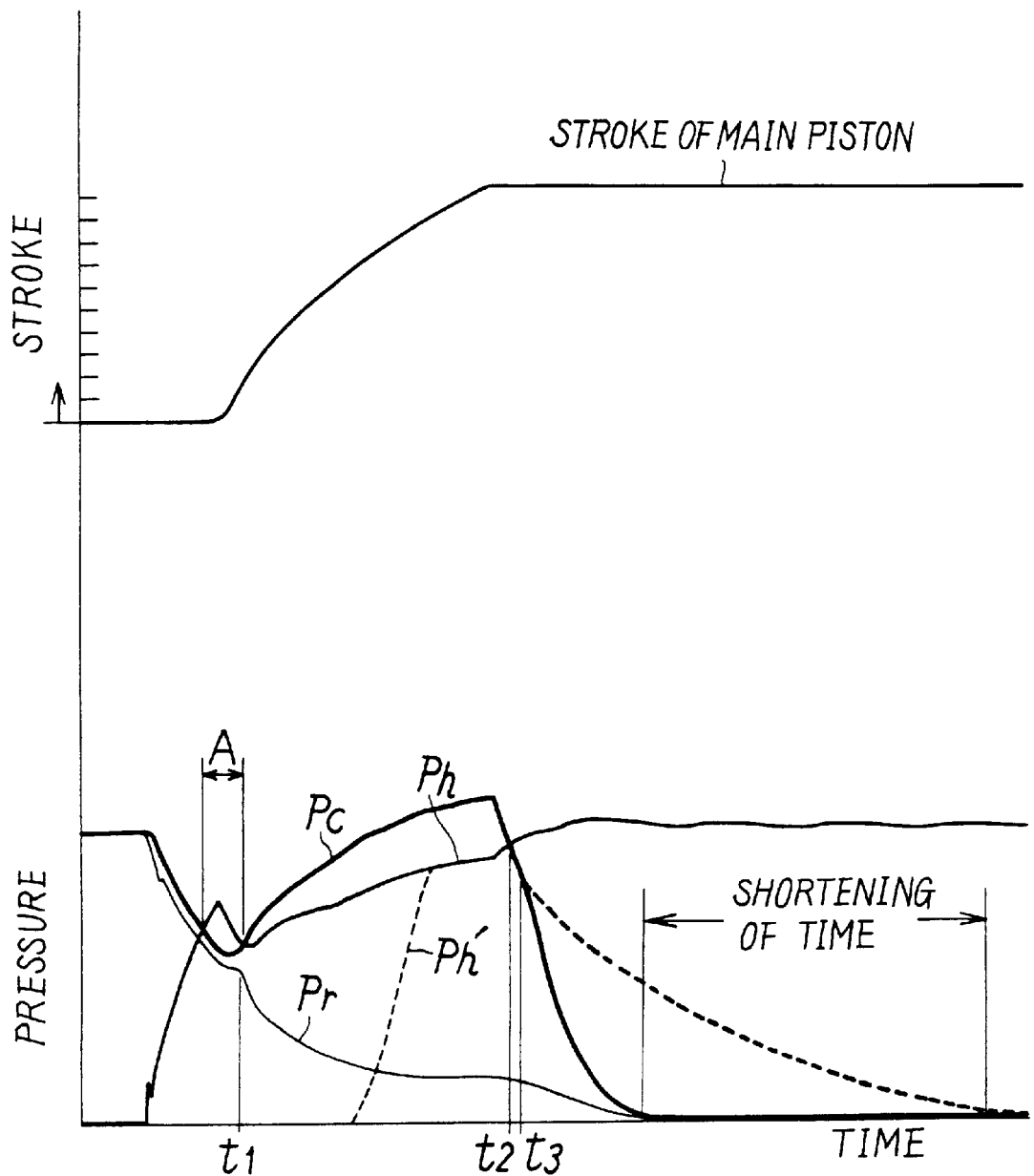
FIG. 7 is an explanatory view for explaining an example of a form of operation of the cylinder with the cushioning mechanism.

In the cushioning mechanism, as shown in FIG. 4 or FIG. 7, when compressed air at pressure Ph is supplied from the main port 38 into the head-side pressure chamber 35 to drive the main piston 12 and the cushion ring 25 rushes into the cushion packing 27 at time $t_1$, an exhaust flow path extending from the rod-side pressure chamber 30 through the recessed portion 26 to the main port 31 is closed and exhaust from the pressure chamber 30 is discharged restrictively from the main port 31 through the flow path 32, the throttle valve 33, and the recessed portion 26. Therefore, pressure Pr in the recessed portion 26 on a secondary side of the throttle valve 33 reduces while pressure Pc in the pressure chamber 30 on a primary side of the throttle valve 33 increases to about 1.6 times the supplied pressure Ph and this pressure exerts cushioning operation on the main piston 12.

In order to move the main piston 12 rearward, compressed air in the head-side pressure chamber 35 is discharged and compressed air is supplied from the main port 31 into the recessed portion 26 simultaneously. Thus, the compressed air in the recessed portion 26 pushes the cushion packing 27 open and flows into the rod-side pressure chamber 30 and therefore, the main piston 12 starts to move rearward. After the cushion ring 25 moves out of the cushion packing 27, compressed air flows from the recessed portion 26 and directly into the pressure chamber 30 and therefore, the main piston 12 continues to move rearward.

The above-described cushioning mechanism is effective on demands such as reduction of wear of a tool such as a welding rod at a tip end of the piston rod 13 and diminishing of a collision sound which a prior-art cylinder for a pneumatic spot welding gun or the like cannot satisfy. However, a speed of the piston rod 13 is reduced due to the cushioning operation even though it is temporary, which becomes a detriment to shortening of time for processing such as welding (speedup). Especially when a speed of the piston rod 13 near an end of a forward stroke is reduced and then a workpiece is pressurized with maximum output in spot welding and other processing, if a cushioning stroke is continued to gradually reduce internal pressure Pc of the rod-side pressure chamber 30, i.e., back pressure of the main piston 12 as shown by a dotted line on an extension of a curve of pressure Pc shown in FIGS. 4 and 7, a timing of the pressurization is delayed seriously and, as a result, the processing time becomes considerably long.

FIGS. 2, 3, 5, and 6 show embodiments of a workpiece high-speed pressurizing mechanism which solves such problems.

Figure 2:
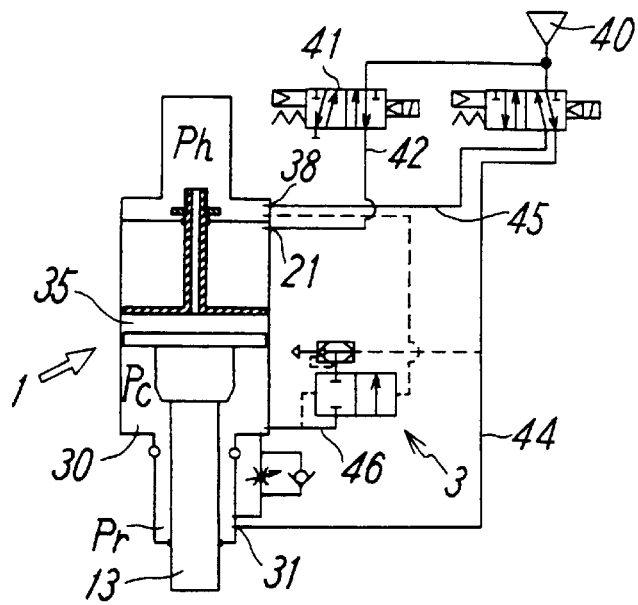
FIG. 2 is a block diagram illustrating a first embodiment of the cylinder with the cushioning mechanism and having a high-speed pressurizing mechanism of the invention mainly by using symbol marks.
Figure 3:
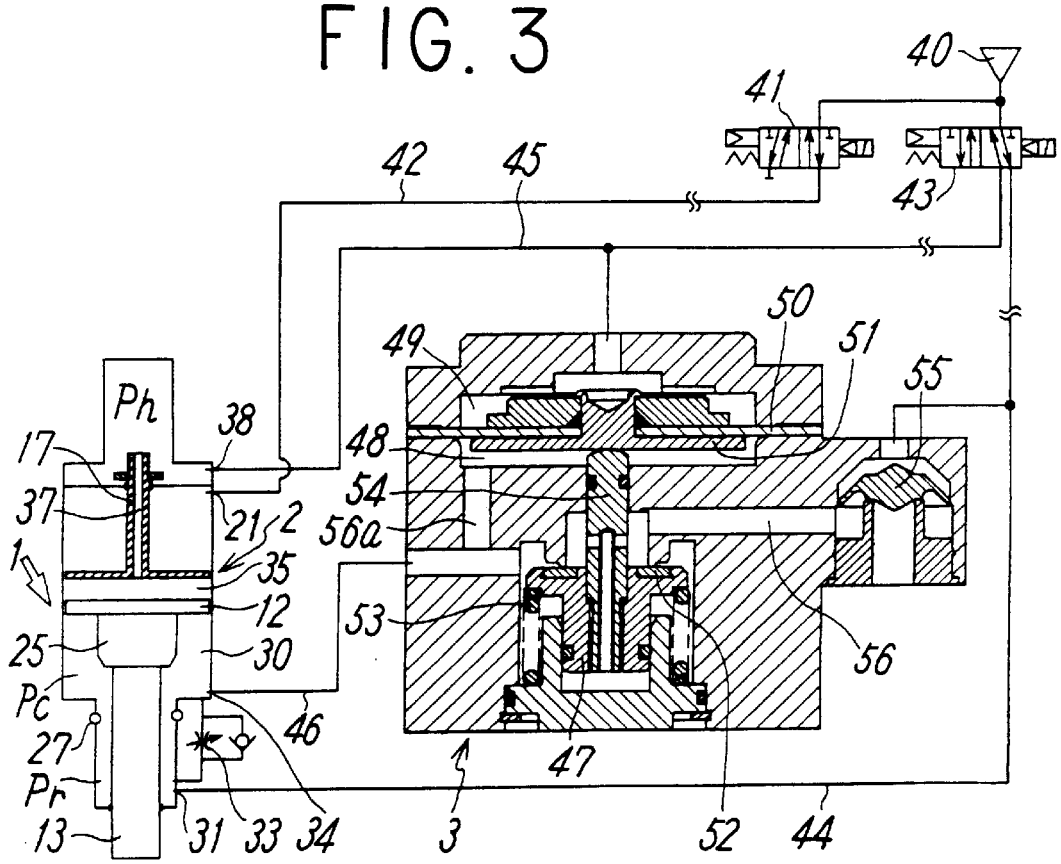
FIG. 3 is a block diagram accurately illustrating an example of a structure of a rapid exhaust valve of the first embodiment.

First, a first embodiment shown in FIGS. 2 and 3 will be described. In this embodiment, the auxiliary port 21 of the cylinder 1 described above is connected to an air pressure source 40 by a duct 42 through a solenoid valve 41 and the main ports 31 and 38 are connected to the air pressure source 40 by ducts 44 and 45 through a solenoid valve 43 such that the main ports 31 and 38 can be alternately connected to the air pressure source 40 and the atmosphere by switching the solenoid valve 43. The connecting port 34 is connected to the rapid exhaust valve 3 by a duct 46.

As the rapid exhaust valve 3, it is possible to use various types of rapid exhaust valves in which detection that the internal pressure Pc of the rod-side pressure chamber 30 on an exhaust side has reduced to be lower than the internal pressure Ph of the head-side pressure chamber 35 on a pressurizing side when cushioning by the cushioning mechanism operates triggers operation of the rapid exhaust valves. The rapid exhaust valve 3 shown as an example of such a rapid exhaust valve in FIG. 3 includes a diaphragm 50, two pressure receiving chambers 48 and 49 formed on opposite sides of the diaphragm 50, an exhaust flow path 56 communicating with the one pressure receiving chamber 48 through a branch path 56a, an open/close valve 47 for opening and closing a valve seat 52 in the exhaust flow path 56, and a check valve 55 provided at an outlet of the exhaust flow path 56.

The exhaust flow path 56 and the one pressure receiving chamber 48 are connected to the rod-side pressure chamber 30 through the connecting port 34 and the other pressure receiving chamber 49 is connected to the head-side pressure chamber 35 through a pipe 45. In order to cause the open/close valve 47 to operate in synchronization with displacement of the diaphragm 50, a tip end of a stem 54 of the open/close valve 47 extends into the pressure receiving chamber 48 and comes into contact with a shell 51 fixed to the diaphragm 50. The open/close valve 47 is repulsed by a spring 53 in such a direction as to close the valve seat 52.

Internal pressure of the recessed portion 26 acts on the check valve 55 as back pressure through a duct 44 and compressed air in the rod-side pressure chamber 30 pushes the check valve 55 open and is directly released into the atmosphere due to opening of the open/close valve 47. Therefore, there is no need to discharge the compressed air through a long duct such as a tube. As a result, the back pressure of the main piston in the pressure chamber 30 can be reduced rapidly.

Next, operation of the pressurizing mechanism having the above structure will be described in detail by reference to FIGS. 3 and 4.

If compressed air at pressure Ph is supplied into the head-side pressure chamber 35 from the solenoid valve 43 through the duct 45, the main port 38 and the flow path 37 in the setting piston 17, the main piston 12 moves forward and compressed air in the rod-side pressure chamber 30 is discharged in a nonrestrictive manner through the cushion packing 27 from the recessed portion 26 through the main port 31. Then, if the cushion ring 25 rushes into the cushion packing 27 at time $t_1$, the main flow path of exhaust is closed and exhaust from the rod-side pressure chamber 30 is discharged restrictively from the flow path 32 through the throttle valve 33 and the recessed portion 26 from the main port 31. Therefore, the pressure Pr in the recessed portion 26 which is the secondary side of the throttle valve 33 reduces, but the pressure Pc in the pressure chamber 30 which is the primary side of the throttle valve 33 increases to about 1.6 times the supplied pressure Ph. By this pressure, cushioning operation acts on the main piston 12 and the speed of the piston rod 13 is reduced.

At this time, the internal pressure Pc of the rod-side pressure chamber 30 increases temporarily over that of the head-side pressure chamber 35 as described above. However, because the compressed air is gradually flowing out through the throttle valve 33, the internal pressure Pc gradually reduces as the speed of the piston rod 13 reduces and becomes lower than the internal pressure Ph of the pressure chamber 35 by time $t_2$ at the latest which is around the time when the piston rod 13 stops. Then, when the piston rod 13 stops, the piston rod 13 is substantially at the end of the stroke and ready to pressurize the workpiece.

If the internal pressure Pc of the rod-side pressure chamber 30 reduces to be lower than the internal pressure Ph of the head-side pressure chamber 35 as described above, because the pressure chambers 30 and 35 are connected to the pressure receiving chambers 48 and 49 on the opposite face sides of the diaphragm 50 by the ducts 46 and 45, the diaphragm 50 is displaced downward at time $t_3$ when a slight difference is generated between pressures of the pressure receiving chambers and pushes the open/close valve 47 down through the stem 54 to thereby open the valve seat 52. As a result, compressed air from the duct 46, i.e., residual air in the rod-side pressure chamber 30 pushes the check valve 55 open and is rapidly discharged without restriction of the flow rate of the air and the internal pressure Pc of the pressure chamber 30 reduces hastily as shown with a solid line in FIG. 4. This pressure drop is hastier than in a case of continuing to exhaust through the throttle valve 33 as shown with a dotted line in FIG. 4. As a result, maximum output is applied from the main piston 12 to the piston rod 13 in a short time and pressurizing force applied to the workpiece is increased extremely hastily. At this time, the pressure Pr in the duct 44 acts on the check valve 55 as back pressure, but the pressure has reduced relatively and therefore does not hinder opening of the check valve 55.

By this operation of the rapid exhaust valve 3, it is possible to obtain a relatively large amount of shortening of time as additionally remarked at the curve of the pressure Pc in FIG. 4.

In the first embodiment, in an early stage of the forward stroke of the main piston 12 and in a stage in which the compressed air is supplied to the pressurizing-side pressure chamber 35 and the compressed air filled in the exhaust-side pressure chamber 30 is discharged simultaneously, there is a possibility that the rapid exhaust valve is actuated improperly when the internal pressure Pc of the pressure chamber 30 reduces to be lower than the internal pressure Ph of the pressure chamber 35. In FIG. 7, a range A in which a curve of the pressure Ph and the curve of the pressure Pc cross each other is a range in which the improper actuation may occur.

Figure 5:
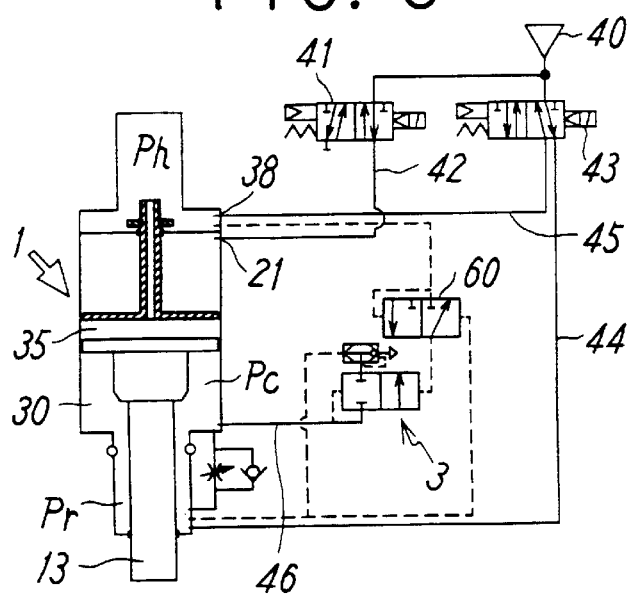
FIG. 5 is a block diagram illustrating a second embodiment of the cylinder with the cushioning mechanism and having the high-speed pressurizing mechanism of the invention mainly by using symbol marks.
Figure 6:
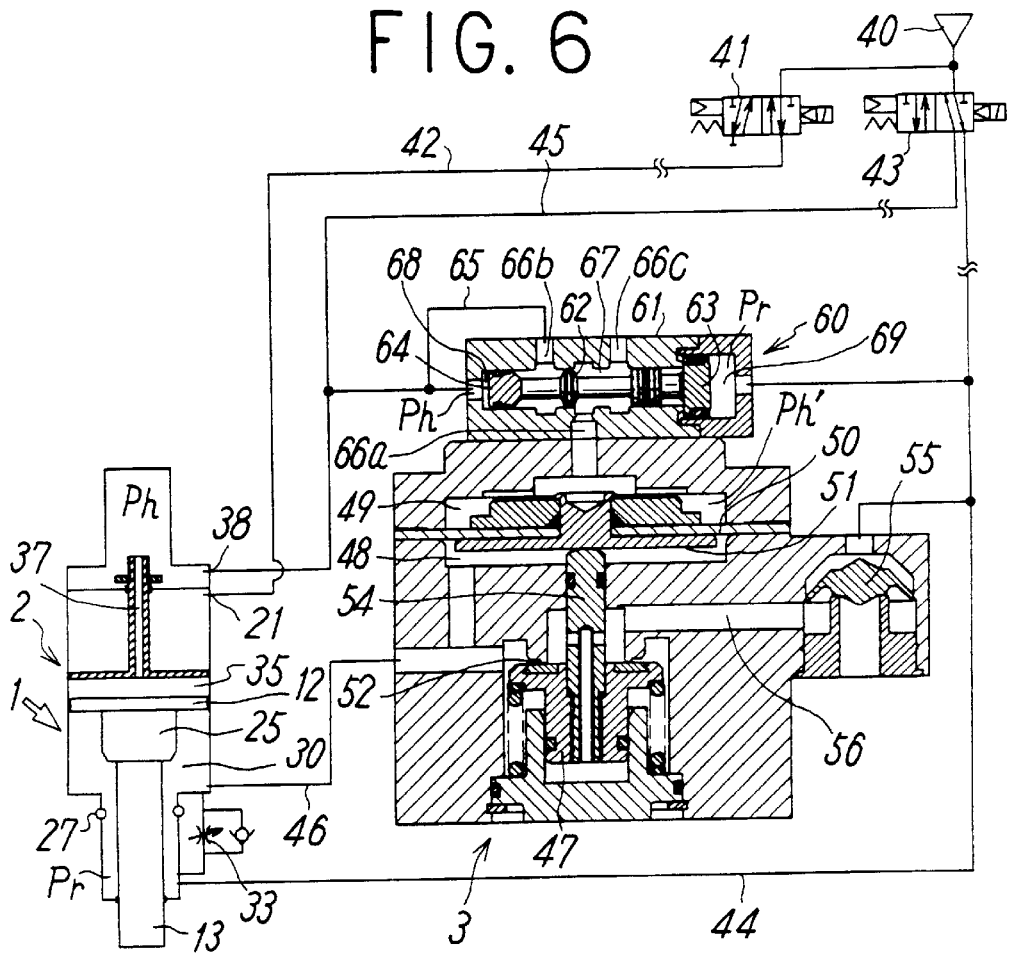
FIG. 6 is a block diagram accurately illustrating an example of a structure of a rapid exhaust valve of the second embodiment.

A second embodiment shown in FIGS. 5 and 6 is intended to solve such a problem. In a pressurizing mechanism of the second embodiment, a differential pressure-driven valve 60 is attached to the raid exhaust valve 3 and it is detected by the differential pressure-driven valve 60 that the pressure Pr in the flow path on the secondary side of the throttle valve 33 has become a certain low percentage of the internal pressure Ph of the head-side pressure chamber 35. As a result, operation of the rapid exhaust valve 3 is triggered by reduction of the internal pressure Pc of the rod-side pressure chamber 30 to lower pressure than the internal pressure Ph of the head-side pressure chamber 35 and reduction of the pressure Pr in the flow path on the secondary side of the throttle valve 33 to a certain low percentage, e.g., 35% or lower, of the internal pressure Ph of the pressure chamber 35.

As shown in detail in FIG. 6, the differential pressure-driven valve 60 includes a valve body 61 having a port 66a communicating with the pressure receiving chamber 49, a port 66b communicating with the head-side pressure chamber 35, and a port 66c opening into the atmosphere, a valve element 62 housed in a valve hole 67 in the valve body 61, two pressure receiving faces 63 and 64 formed at opposite ends of the valve element 62 and having different pressure receiving areas, and pressure receiving chambers 68 and 69 for applying the pressure Ph of the head-side pressure chamber 35 and the pressure Pr of the flow path on the secondary side of the throttle valve 33 to the pressure receiving faces 63 and 64. The valve element 62 is switched from a position shown in FIG. 6 when the pressure Pr becomes a certain low percentage (which can be set arbitrarily), e.g., 35% or lower, of the pressure Ph, connects the port 66a and the port 66b, and introduces the pressure Ph in the duct 45 into the pressure receiving chamber 49 above the diaphragm 50. For this purpose, the pressure receiving faces 63 and 64 have different areas in the above proportion. On the other hand, the valve element 62 occupies the position shown in FIG. 6 and opens the chamber 49 above the diaphragm 50 to the atmosphere through the port 66c while the pressure Pr is the certain percentage obtained by the areas of the pressure receiving faces 63 and 64 or greater with respect to the pressure Ph.

Therefore, according to the second embodiment, as shown in FIG. 7, the pressure in the duct 45 is not introduced into the pressure receiving chamber 49 while the pressure Pr is the certain percentage or greater of the pressure Ph at the early stage of the forward stroke of the main piston 12, the pressure shown with a curve of pressure Ph is introduced into the pressure receiving chamber 49 above the diaphragm when the pressure Pr reduces to be the certain percentage or lower of the pressure Ph, and then operation similar to the first embodiment is carried out. Thus, the above-described improper actuation can be avoided.

Because other structures and operations of the second embodiment are not different from those of the first embodiment, main portions in the drawings are provided with reference numerals similar to those in the first embodiment to omit descriptions of the portions.

In the cylinder 1, the main piston 12 can be stopped in the intermediate position by the intermediate stop position setting means 2 and can occupy an operation preparing position where the piston rod 13 faces the workpiece with a relatively short working stroke because of this setting of the intermediate stop position. Therefore, it is possible to minimize a length of the working stroke in a plurality of times of spot welding or the like to improve efficiency of the operation. When the workpiece is moved to a position facing the piston rod 13 for replacement or the like, the main piston 12 can be moved to a fully returned position at the maximum distance from the workpiece by canceling setting of the intermediate stop position.

Figure 8:
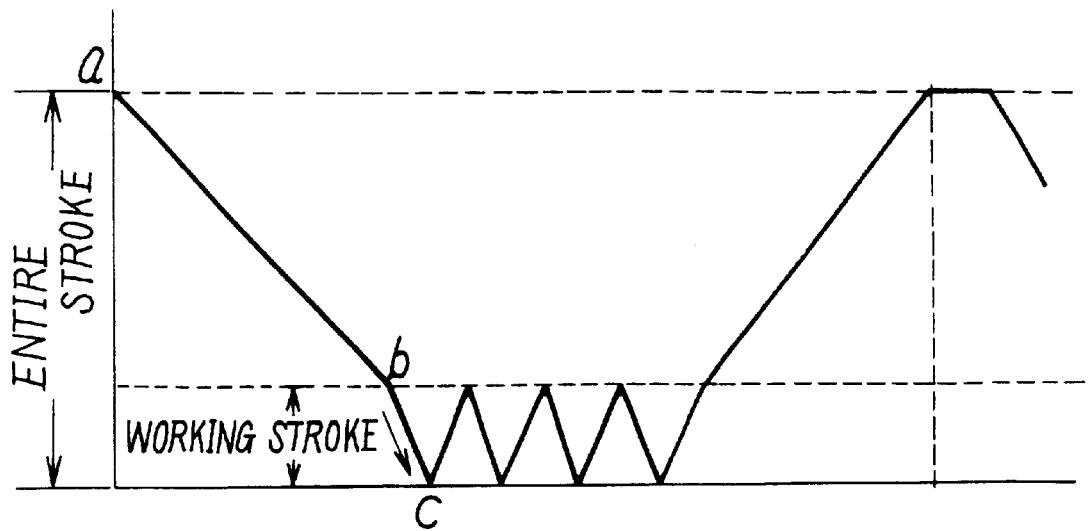
FIG. 8 is an explanatory view for explaining an example of a form of operation of the cylinder with the cushioning mechanism according to the invention.

FIG. 8 shows an example of an operating form of the piston rod 13. In this example, if the compressed air is supplied from the auxiliary port 21 into the pressure chamber 22 to drive the stop position setting piston 14 from a stroke start position a of the entire stroke, the main piston 12 is pushed by the stop position setting piston 14, is driven, and reaches the intermediate stop position b. Then, by alternately repeating supply and discharge of the compressed air into and from the pressure chambers 35 and 30 on the opposite sides of the main piston 12, the piston rod 13 repeats a working stroke of multi-point welding or the like in which the piston rod 13 reciprocates between points b and c. When the repetition ends, the compressed air in the pressure chamber 22 is discharged from the auxiliary port 21 in a state in which the compressed air is supplied to the pressure chamber 30 and the main piston 12 is returned to the original stroke start position.

Especially in a case in which the piston rod 13 is caused to operate with such a working stroke, it is extremely effective at shortening of processing time to carry out pressurization with the maximum output by rapid exhausting after reduction of a speed near the end of the stroke as described above.

The cylinder with the cushioning mechanism of each the above-described embodiment can be used not only as a cylinder for a gun pressurizing mechanism for a welding assembly line of an automobile body, steel furniture, or the like but also as a cylinder of a pressurizing unit in various clamping devices and other cylinders for various uses in which high-speed pressurization is required.

According to the invention described above in detail, it is possible to obtain the high-speed pressurizing method and mechanism by using the cylinder with the cushioning mechanism in which problems of the prior-art fluid pressure cylinder for the spot welding gun or the like are solved. To put it more concretely, it is possible to obtain the workpiece high-speed pressurizing method and mechanism in which an amount of processing time can be minimized by using the cylinder with the cushioning mechanism for reducing the speed of the piston rod near the end of the forward stroke by restrictive discharge of exhaust from the exhaust-side pressure chamber while reducing wear of the tip end of the welding rod or the like and diminishing a collision sound.

Moreover, it is possible to obtain the high-speed pressurizing method and mechanism in the cylinder with the cushioning mechanism in which pressurization with the maximum output can be carried out rapidly after the speed of the piston rod near the end of the forward stroke is reduced and the welding rod or the like comes into contact with the workpiece.

What is claimed is:

1. A workpiece high-speed pressurizing method comprising:

moving a piston rod connected to a main piston forward by supplying air pressure into a head-side pressure chamber of said main piston in a cylinder;

reducing a speed of said piston rod near an end of a forward stroke of said piston rod by a cushioning mechanism including a throttle device configured to restrict a flow rate of exhaust flowing out of a rod-side pressure chamber; and pressurizing a workpiece with said piston rod, wherein a rapid exhaust valve is operated when internal pressures of said head-side pressure chamber and rod-side pressure chamber are compared and the internal pressure of said rod-side pressure chamber is lower than the internal pressure of said head-side pressure, and when the cushioning mechanism reduces the internal pressure of said rod-side pressure chamber to be lower than the internal pressure of said head-side pressure chamber, the rapid exhaust valve is triggered to open an exhaust flow path connecting said rod-side pressure chamber and atmosphere to directly exhaust compressed air from said rod-side pressure chamber into the atmosphere, thereby reducing back pressure of said main piston in said rod-side pressure chamber to pressurize said workpiece at a high speed.

2. A high-speed pressurizing method according to claim 1, wherein said rapid exhaust vale has a diaphragm, said diaphragm is displaced by applying said internal pressures of said head-side pressure chamber and said rod-side pressure chamber to opposite faces of said diaphragm, and opening said exhaust flow path by an open/close valve for operating in synchronization with displacement of said diaphragm.

3. A workpiece high-speed pressurizing method comprising:

moving a piston rod connected to a main piston forward by supplying air pressure into a head-side pressure chamber of said main piston in a cylinder;

reducing a speed of said piston rod near an end of a forward stroke of said piston rod by a cushioning mechanism including a throttle device configured to restrict a flow rate of exhaust flowing out of a rod-side pressure chamber; and pressurizing said workpiece with said piston rod, wherein a rapid exhaust valve is operated when internal pressures of said head-side pressure chamber and rod-side pressure chamber are compared and the internal pressure of said rod-side pressure chamber is lower than the internal pressure of said head-side pressure, and when the cushioning device reduces the internal pressure of said rod-side pressure chamber to be lower than the internal pressure of said head-side pressure chamber and when internal pressure of a flow path on a secondary side of said throttle device becomes a certain percentage of said internal pressure of said head-side pressure chamber, the rapid exhaust valve is triggered to open an exhaust flow path connecting said rod-side pressure chamber and atmosphere to directly exhaust compressed air from said rod-side pressure chamber into the atmosphere, thereby reducing back pressure of said main piston in said rod-side pressure chamber to pressurize said workpiece at a high speed.

4. A high-speed pressurizing method according to claim 3, wherein said rapid exhaust vale has a diaphragm, an open/close valve for opening and closing said exhaust flow path, and a differential pressure-driven valve for operating by said internal pressure of said flow path on said secondary side of said throttle and said internal pressure of said head-side pressure chamber, said internal pressure of said rod-side pressure chamber is applied to one side face of said diaphragm and said internal pressure of said head-side pressure chamber is applied to the other side face of said diaphragm through said differential pressure-driven valve when said internal pressure of said flow path on said secondary side of said throttle becomes said certain low percentage of said internal pressure of said head-side pressure chamber to thereby displace said diaphragm and open said exhaust flow path by said open/close valve for operating in synchronization with said diaphragm.

5. A workpiece high-speed pressurizing mechanism comprising a cylinder including a main piston configured to be driven by air pressure, a piston rod connected to said main piston, a rod-side pressure chamber formed on a piston rod side of said main piston, a head-side pressure chamber formed on an opposite side of said rod-side pressure chamber, and said cushioning mechanism configured to reduce a speed of said piston rod near an end portion of a projecting stroke and including a throttle device configured to restrict a flow rate of exhaust flowing out of said rod-side pressure chamber; and a rapid exhaust valve connected to said cylinder, and configured to open an exhaust flow path connecting said rod-side pressure chamber and atmosphere when internal pressures of said rod-side pressure chamber is reduced to pressures lower than internal pressure of said head-side pressure chamber by said cushioning mechanism, wherein said rapid exhaust valve is operated when the internal pressures of said head-side pressure chamber and rod-side pressure chamber are compared and the internal pressure of said rod-side pressure chamber is lower than the internal pressure of said head-side pressure.

6. A high-speed pressurizing mechanism according to claim 5, wherein said rapid exhaust valve includes a diaphragm, two pressure receiving chambers formed on opposite sides of said diaphragm and connected to said head-side pressure chamber and said rod-side pressure chamber, and an open/close valve provided in said exhaust flow path to open and close said exhaust flow path in synchronization with displacement of said diaphragm.

7. A high-speed pressurizing mechanism according to claim 5, wherein:

said cylinder has a cylinder tube in which said main piston is housed, a head cover mounted to an end of said cylinder tube, a rod cover which is mounted to the other end of said cylinder tube and which said piston rod passes through for sliding, and intermediate stop position setting means for setting an intermediate stop position of said main piston;

said intermediate stop position setting means has a stop position setting piston housed for sliding between said main piston and said head cover, a setting rod connected to said setting piston and passing for sliding through said head cover, a stopper provided to said setting rod to define a stop position of said setting piston, and a contact portion which is formed at said head cover and with which said stopper comes in contact; and a flow path for supplying and discharging compressed air to and from said head-side pressure chamber is provided in said setting rod.

8. A high-speed pressurizing mechanism according to claim 7, wherein said cylinder has an auxiliary pressure chamber for driving said setting piston between said setting piston and said head cover, an auxiliary port for supplying compressed air to said auxiliary pressure chamber is provided to said head cover, said head cover has an encapsulating tube in which an end portion of said setting piston is fitted and a main port communicating with an inside of said encapsulating tube, and compressed air is supplied to said head-side pressure chamber from said main port through flow paths in said encapsulating tube and said setting rod.

9. A high-speed pressurizing mechanism comprising:

a cylinder including a main piston configured to be driven by air pressure, a piston rod connected to said main piston, a rod-side pressure chamber formed on a piston rod side of said main piston, a head-side pressure chamber formed on an opposite side of said rod-side pressure chamber, and a cushioning device configured to reduce a speed of said piston rod near an end portion of a projecting stroke and including a throttle device configured to restrict a flow rate of exhaust flowing out of said rod-side pressure chamber;

a rapid exhaust valve connected to said cylinder and configured to open an exhaust flow path connecting said rod-side pressure chamber and atmosphere, wherein said rapid exhaust valve has a differential pressure-driven valve for detecting internal pressure of a flow path on a secondary side of said throttle device becoming a certain percentage of said internal pressure of said head-side pressure chamber and said rapid exhaust valve is configured to open said exhaust flow path when internal pressures of said rod-side pressure chamber is reduced to pressures lower than internal pressure of said head-side pressure chamber by said cushioning mechanism and said internal pressure of said flow path on said secondary side of said throttle device is reduced to said certain percentage of said internal pressure of said head-side pressure chamber.

10. A high-speed pressurizing mechanism according to claim 9, wherein said rapid exhaust valve further includes a diaphragm, two pressure receiving chambers formed on opposite sides of said diaphragm and connected to said head-side pressure chamber and said rod-side pressure chamber, and an open/close valve provided in said exhaust flow path and configured to open and close said exhaust flow path in synchronization with displacement of said diaphragm, and said differential pressure-driven valve is configured to drive the diaphragm by detecting the internal pressure of the flow path on the secondary side of said throttle device becoming the certain percentage of said head-side pressure chamber.

11. A high-speed pressurizing mechanism according to claim 10, wherein said differential pressure-driven valve has a valve element for connecting said pressure receiving chamber on one side of said diaphragm to said head-side pressure chamber and atmosphere, two pressure receiving faces formed at opposite ends of said valve element and having different pressure receiving areas, and two pressure receiving chambers for applying said internal pressure of said head-side pressure chamber and said internal pressure of said flow path on said secondary side of said throttle to said pressure receiving faces.

12. A high-speed pressurizing mechanism according to claim 9, wherein:

said cylinder has a cylinder tube in which said main piston is housed, a head cover mounted to an end of said cylinder tube, a rod cover which is mounted to the other end of said cylinder tube and which said piston rod passes through for sliding, and intermediate stop setting means for setting an intermediate stop position of said main piston;

said intermediate stop position setting means has stop position setting piston housed for sliding between said main piston and said head cover, a setting rod connected to said setting piston and passing for sliding through said head cover, a stopper provided to said setting rod to define a stop position of said setting piston, and a contact portion which is formed at said head cover and with which said stopper comes in contact; and a flow path for supplying and discharging compressed air to and from said head-side pressure chamber is provided in said setting rod.

13. A high-speed pressurizing mechanism according to claim 12, wherein said cylinder has an auxiliary pressure chamber for driving said setting piston between said setting piston and said head cover, an auxiliary port for supplying compressed air to said auxiliary pressure chamber is provided to said head cover, said head cover has an encapsulating tube in which an end portion of said setting piston is fitted and a main port communicating with an inside of said encapsulating tube, and compressed air is supplied to said head-side pressure chamber from said main port through flow paths in said encapsulating tube and said setting rod.

* * * * *